, 023,211
METHOD FOR THE PREPARATION OF PIPERAZINE MONOHYDROCHLORIDE

Myrl Lichtenwalter, Austin, Tex., assignor to Jefferson Chemical Company, Inc., Houston, Tex., a corporation of Delaware
No Drawing. Filed Sept. 12, 1960, Ser. No. 55,174
2 Claims. (Cl. 260—268)

Piperazine monohydrochloride is useful as an anthelmintic for de-worming livestock and other domestic animals. This material has been prepared by the reaction of piperazine with hydrochloric acid in aqueous solution. The preparation of piperazine monohydrochloride from piperazine and hydrochloric acid presents many problems, however, and practice of this method has left much to be desired.

Thus, for example, piperazine monohydrochloride is an essentially neutral compound which, in aqueous solution, will provide a solution having a pH within the range from about 6.5 to 9. However, hydrochloric acid, in commercial grades, will normally contain iron contaminants and will pick up iron contaminants due to corrosion of the equipment used in the preparation of the piperazine monohydrochloride unless special equipment, such as glass lined equipment is used. Iron and (other contaminants are highly objectionable. For example, even minor amounts of iron contamination will cause discoloration of the product. Therefore special precautions must normally be taken in the preparation of the piperazine monohydrochloride in order to avoid the introduction of contaminants or else special cleanup procedures must be employed.

These and related problems are overcome through the provision of the process of the present invention which may briefly be described as a method for the preparation of piperazine monohydrochloride by the reaction of piperazine with ammonium chloride in aqueous solution. In somewhat greater detail, piperazine monohydrochloride may be prepared in normally corrodible iron equipment, such as stainless steel, by adding ammonium chloride to an aqueous solution of piperazine, whereby ammonia is liberated, whereby piperazine monohydrochloride is formed and whereby impurities are selectively precipitated from the resultant reaction product for facile removal. Thus, surprisingly, the ammonium chloride functions also in the manner of a scavenging agent by promoting the selective precipitation of impurities.

The starting materials for the present invention are piperazine, water, and ammonium chloride. The piperazine and ammonium chloride may have minor quantities of impurities, such as iron impurities, amine type impurities, etc., associated therewith which impart objectionable ordor or objectionable color or both to the final product unless they are removed.

A preferred embodiment of the present invention comprises the steps of preparing an aqueous solution of piperazine which preferably contains from about 6 to 15 mols of water per mol of piperazine, and still more preferably from 6.5 to 10 mols of water per mol of piperazine. From about 0.8 to about 1.2 mols of ammonium chloride per mol of piperazine is added to the aqueous solution of piperazine with agitation at a temperature within the range of about 20° to 120° C. over a period of about 0.5 to 5 hours. During the addition of the ammonium chloride, ammonia will be liberated from the solution and, therefore, suitable means should be provided for the recovery or safe disposal of the ammonia. At the end of the ammonium chloride addition, an aqueous solution of piperazine monohydrochloride will have been formed and, surprisingly, substantially complete precipitation of iron and amine type impurities, if any, will have occurred.

Preferably, the resultant reaction mixture is heated at its boiling point for a suitable point of time (e.g. from about 0.2 to 2 hours) sufficient to boil off residual ammonia dissolved in the reaction mixture in order to provide a solution containing less than about 0.3% of ammonia. During the boiling step, water is stripped from the solution. Therefore, excess water is added before or during the ammonia stripping step (e.g. at the commencement of the reaction or at a later time) and, during or subsequent to the ammonia stripping step sufficient water is removed so as to provide a final product containing from about 0.9 to about 1 mol of piperazine and from about 6.5 to about 8.7 mols of water per mol of chloride radical. Normally, an excess of about 0.5 to about 2 mol of water per mol of piperazine should be provided for the ammonia stripping step.

Thereafter, precipitated impurities (which are normally present in the range of 0.1 to about 2 wt. percent based on the total weight of the solution), are removed by simple filtration to thereby provide an essentially neutral piperazine monohydrochloride solution having an actual piperazine content in excess of about 30% by wt., a specific gravity of more than about 1.088, and a pH (one part of product to 5 parts of water) of about 7.5 to 9. A filter aid such as charcoal, diatomaceous earth, etc. may be used for the filtering step, if desired.

The invention will be further illustrated by the following specific examples which are given by way of illustration and not as limitations on the scope of this invention:

EXAMPLE 1

Run 2214–9 was made using a 1 mol of ammonium chloride: 1.104 mols piperazine: 9.880 mols of water feedstock ratio. The reactants were heated in a 3,000 ml., 3-necked flask for 2.5 hours. Ammonia was still being slowly liberated at the end of this time; therefore, additional water was added to the reaction flask and boiled overhead to remove trace amounts of ammonia remaining. About 0.2% by weight of the resultant reaction mixture was filtered off as insoluble precipitate. It is felt that the precipitate was a result of impurities in the technical grade ammonium chloride which was used. pH of 1 part product: 5 parts distilled water was 8.85.

EXAMPLE 2

Run 2214–10 was made using a 1 mol of ammonium chloride: 1 mol of piperazine: 8.644 mols of water feedstock ratio. Additional water equivalent to about 0.5 mol/mol of ammonium chloride was added and the reaction mixture heated for 78 minutes. The additional water added was taken overhead at the end of this period in order to remove most of the remaining traces of ammonia. About 0.5% by weight of the resultant reaction mixture again precipitated as insoluble salts. pH of 1 part product: 5 parts distilled water was 8.5; piperazine concentration was 31.45% by weight; specific gravity was 1.0976 at 20/20° C.; platinum-cobalt color was 100; and, the ammonia content was 0.2% by weight. Piperazine concentration expressed another way was 34.5 grams per 100 ml. of solution. Charcoal treatment and filtration of a portion of the product produced a water white filtrate. The freezing point of the sample was found to be −22.5° C. It is believed the optimum ratio of reactants was used in this run.

EXAMPLE 3

Run 2214–11 was made using 1 mol of ammonium chloride: 0.9 mol piperazine: 6.622 mols of water feedstock ratio. Additional water equivalent to 1.11 mols/mol of ammonium chloride was added and the reaction mixture heated for 95 minutes. Additional water was taken overhead at the end of this period. About 0.4% by weight of the resultant reactant mixture was filtered off as insoluble precipitate. pH of 1 part product: 5 parts distilled water was 7.5; piperazine concentration was 32.1% by weight or 35.7 grams/100 ml. of solution at 20/20° C., specific gravity was 1.1117 at 20/20° C.; the ammonia content was 0.91% by weight; and, the platinum-cobalt color was 100. A precipitate formed when the sample was cooled to −2° C.

Further details of these runs are given in Table I:

Table 1
PREPARATION OF PIPERAZINE HYDROCHLORIDE NEUTRAL SOLUTION PRODUCED USING AMMONIUM CHLORIDE

| Run No. | 2214-9 | 2214-10 | 2214-11 |
|---|---|---|---|
| Charge: | | | |
| Piperazine added (98%), gms | 970 | 879 | 791 |
| Piperazine added, mols | 11.043 | 10.000 | 9.000 |
| Water added, ml | 1,787 | 1,562 | 1,197 |
| Water added, mols | 98.803 | 86.444 | 66.222 |
| Ammonium chloride added (99%), gms | 540 | 540 | 540 |
| Ammonium chloride added, mols | 10.000 | 10.000 | 10.000 |
| Reaction details: | | | |
| Time heated, minutes | 180 | 78 | 85 |
| Additional water added, ml | 100 | 100 | 200 |
| Water taken overhead, ml | 118 | 109 | 200 |
| Max. temp. attained during boiling, °C | 107 | 107 | 109 |
| Product recovered before filtering, gms | 3,092 | 2,770 | 2,354 |
| Precipitate loss, grams | 8 | 14 | 13 |
| Properties of product: | | | |
| pH of 1 part product:5 parts distd. water | 8.85 | 8.5 | 7.5 |
| Piperazine, weight percent (corrected for $NH_3$ content) | | 31.45 | 32.1 |
| Specific gravity, 20/20° C | | 1.0976 | 1.1117 |
| Ammonia, weight percent | | 0.2 | 0.9 |
| Piperazine conc., gms./100 ml. soln. at 20° C | | 34.5 | 35.7 |
| Platinum-cobalt color | | 100 | 100 |
| Freezing point, ° C | | −22.5 | 1−2 |

1 Approximately.

What is claimed is:

1. A method for the preparation of an essentially neutral aqueous solution of piperazine monohydrochloride containing from about 6.5 to about 8.7 mols of water per mol of piperazine monohydrochloride, said method comprising the steps of dissolving piperazine in excess of the amount of water desired in the said solution, adding from about 1 to about 1.1 mols of ammonium chloride per mol of piperazine to the thus formed piperazine solution over a period of about 0.5 to 5 hours at a temperature within the range of about 20° to about 120° C. whereby the ammonium chloride will react with the piperazine to provide piperazine monohydrochloride and whereby ammonia is liberated, at least a portion of said liberated ammonia remaining dissolved in the thus formed reaction mixture, and, after said ammonium chloride addition, stripping excess water from said reaction mixture, whereby said dissolved ammonia is also stripped from said solution, and filtering the remaining solution after said stripping step to thereby provide said desired aqueous solution of piperazine monohydrochloride.

2. A method which comprises the steps of dissolving piperazine in not less than about 6 mols of water per mol of piperazine, adding from about 1 to about 1.1 mols of ammonium chloride per mol of piperazine to said piperazine solution over a period of about 0.5 to 5 hours with agitation at a temperature within the range of about 20° to about 120° C. whereby said ammonium chloride will react with said piperazine to form an aqueous solution of piperazine monohydrochloride and whereby ammonia will be liberated, at least some of said ammonia remaining dissolved in said piperazine monohydrochloride solution, adding from about 0.5 to 2 mols of water per mol of piperazine monohydrochloride to said piperazine monohydrochloride solution, and thereafter stripping water from said solution in an amount sufficient to provide at the end of said water stripping step an aqueous solution of piperazine monohydrochloride containing from about 6.5 to about 8.7 mols of water per mol of piperazine monohydrochloride, whereby said dissolved ammonia is substantially completely stripped from said aqueous solution and filtering the remaining solution to thereby provide an essentially neutral and essentially colorless aqueous solution of piperazine monohydrochloride containing from about 6.5 to about 8.7 mols of water per mol of piperazine monohydrochloride.

References Cited in the file of this patent
FOREIGN PATENTS

| 595,431 | Great Britain | Dec. 4, 1947 |
| 762,625 | Great Britain | Nov. 28, 1956 |
| 788,121 | Great Britain | Dec. 23, 1957 |